United States Patent Office 3,316,326
Patented Apr. 25, 1967

3,316,326
BLOCK POLYESTERS OF POLYALKYLENE TEREPHTHALATE AND POLYPHENYL ESTERS
Richard Keith Quisenberry, Kinston, N.C., assignor to E. I. du Pont de Nemours and Company, Wilmington, Del., a corporation of Delaware
No Drawing. Filed Feb. 2, 1965, Ser. No. 429,890
9 Claims. (Cl. 260—860)

This invention relates to novel and useful block copolyesters. More specifically it relates to block copolyesters of high molecular weight having particular utility in the form of fiber and film.

While copolymerization is recognized as a means of modifying particular properties of fibers such as dyeability, the introduction of random copolymeric units into fiber-forming polyalkylene terephthalates has been observed to be attended by a loss in vital physical properties such as lower melting point, reduced modulus and tenacity and loss of crystallinity.

It is an object of the present invention to provide a copolymer modified polyalkylene terephthalate suitable for making fiber having a relatively high tensile strain recovery property.

Another object is to provide a novel and useful block copolymer of a polyalkylene terephthalate and a polyphenyl ester.

These and other objects will become apparent in the course of the following specification and claims.

In accordance with the present invention a fiber-forming block copolyester is provided having a structure from the class consisting of:

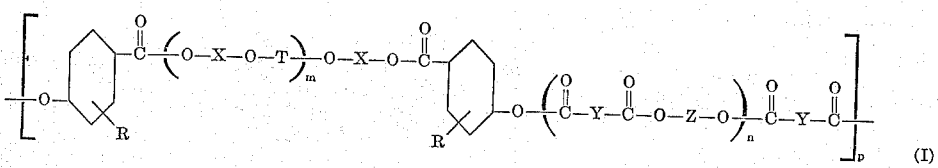

and

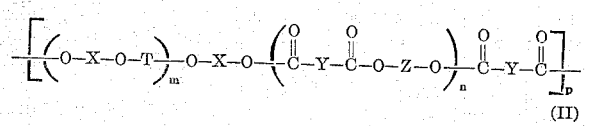

wherein —X— is lower alkylene, —T— is

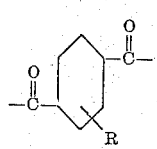

wherein the hexagon represents the benzene nucleus and R is a member of the class consisting of hydrogen, of the said benzene nucleus, and a substituent for no more than two hydrogen atoms of the said nucleus, said substituent being from the class consisting of lower alkyl, halogen, nitro, cyano and alkoxy, $m$ is large number to provide a polyester group having a molecular weight of between about 900 and 3000, Y represents a member of the class consisting of

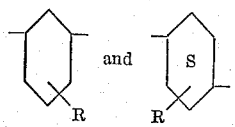

and Z represents a member of the class consisting of

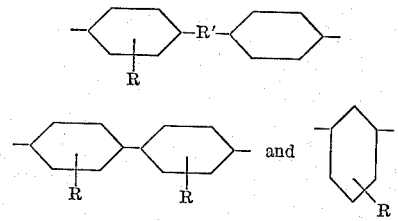

wherein R′ is a member of the class consisting of lower alkylene,

and —O—, $n$ being a large number to provide a polyester group having a molecular weight of between about 4,000 and 10,000, $p$ being a number from 1 to about 10 inclusive. By "lower alkylene" is meant a saturated, divalent hydrocarbon radical containing from two to about six carbon atoms.

The TSR measurement is conducted as described by W. W. Daniels in the Textile Research Journal, vol. 30, p. 656 (1960). The procedure involves mounting a 10 in. specimen in the yarn clamps of an Instron tensile tester, immersing the specimen in 40° C. water for two minutes and then extending to the elongations prescribed where the clamp separation is maintained for another two minute period. The immersion tank is then removed from the specimen and the stress dropped to 0.042 g.p.d., and maintained for a further two minute period. The Instron clamps are then returned to the original separation and the increase in yarn slack measured. The difference between the amount of elongation imparted to the yarn and the amount of slack remaining after recovery is an indication of the recovery obtained at the specific elongation.

The following examples are cited to illustrate the invention. They are not intended to limit it in any manner. Inherent viscosity values reported are measured at 0.25% (by weight) concentration in a 75:25 (by volume) mixture of methylene chloride:trifluoroacetic acid at 25° C.

EXAMPLE I

A polymer is prepared corresponding to the formula

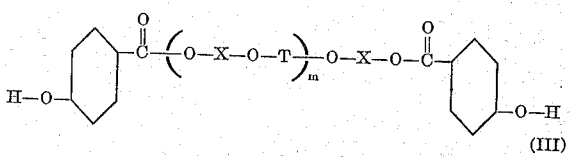

wherein —X— is ethylene, $m$ being about 10 to provide a molecular weight of about 2200.

In preparing polymer (III), a polymer preparation tube equipped with a stirrer and a nitrogen sweep is charged with 25.4 grams of dihydroxyethylterephthalate, 3.04 grams methyl-p-hydroxybenzoate, .0077 gram $Sb_2O_3$ (dissolved in 3.9 ml. of ethylene glycol) and 0.114 gram of manganous acetate tetrahydrate (dissolved in 5.7 ml. of hylene glycol). The tube is heated at 160° C. for 50 minutes under atmospheric pressure. A polymerization cle as reported below is then followed.

| Temp. (° C.) | Pressure (in mm. Hg) | Period (min.) |
|---|---|---|
| 200 | 15 | 10 |
| 220 | 15 | 5 |
| 235 | 20 | 20 |
| 240 | 27 | 10 | he polymerization is completed by heating at 240° C. nder 0.5 mm. of mercury for 50 minutes. The product a clear melt which cools to an opaque white solid having an inherent viscosity of 0.20.

The diacid chloride of a polyphenylene ester is prepared, corresponding to the formula

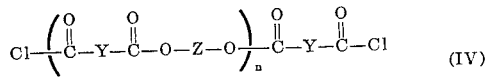

$$Cl\left(\begin{matrix}O & O \\ \| & \| \\ C-Y-C-O-Z-O\end{matrix}\right)_n\begin{matrix}O & O \\ \| & \| \\ C-Y-C-Cl\end{matrix} \quad (IV)$$

vherein —Y— is m-phenylene and —Z— is 2,2-bis(p-phenylene)propane.

In preparing polymer (IV), a polymer preparation ube as described above is charged with 22.8 grams of 2,2-diphenylolpropane, 21.2 grams of isophthalyol chloride and 300 ml. of 1,1,2,2-tetrachloroethane. The solution is heated at 144° C. for 72 hours, at atmospheric pressure with a constant nitrogen bleed-in. The product has an inherent viscosity of about 0.35 and an end group ratio, COCl/OH, of about 80/1. The polymer (mol. wt. 8800; $n=24$) is not isolated from solution but used directly as described below in preparing the polymer of Formula I.

A polymer corresponding in formula to (I) is prepared by adding 9.25 grams finely divided polymer (III) to the refluxing solution of polymer IV. The reaction is stirred at reflux with a constant nitrogen bleed-in at atmospheric pressure. The reaction mixture is refluxed for 72 hours and precipitated by addition of the reaction mass to rapidly stirred n-hexane. The product is washed successively with acetone, water 5% sodium bicarbonate, water and acetone. It has an inherent viscosity of 0.93 and a polymer melt temperature of 259° C. A solution containing 21% by weight polymer is prepared using a 70/30 (by volume) mixture of chlorinated hydrocarbons (e.g. trichloroethylene, chlorobenzene) and trifluoroacetic acid. Filaments are spun, drawn and boiled off. The draw ratio (DR), drawing temperature, tensile properties of tenacity elongation and modulus (T/E/Mi) both before boil off (BBO) and after boil off (ABO) along with the tensile strength recovery (TSR) are reported in Table 1.

TABLE 1

| Drawing | | Tensile Prop. | | Percent Boil Off Shrinkage | TSR |
|---|---|---|---|---|---|
| D.R. | Temp. (° C.) | BBO T/E/Mi | ABO T/E/Mi | | |
| 2.5 | 85 | .98/12/25 | .98/45/19 | 2.4 | 77 |
| 2.0 | 147 | 1.21/42/24 | .90/49/16 | 4.3 | ---- |
| 2.5 | 147 | 1.62/23/30 | 1.25/29/25 | 4.4 | ---- |
| 3.0 | 147 | 1.53/11/34 | 1.46/21/26 | 6.1 | 70 |

The TSR of the fibers of these polymers compares well with that of fibers from the fiber-forming homopolymer of 2,2 - diphenylolpropane and isophthaloyl chloride (81%). The TSR of fiber-forming polyethylene terephthalate is about 62%.

A series of analogous polymers is prepared following the procedure described above from the polymeric intermediate (III) of this example and polymeric intermediates of various molecular weights corresponding to (IV). For comparative illustrative purposes fiber-forming polymers of Formula II are made from the intermediates of various molecular weights corresponding to (IV) with a polymeric intermediate of the formula

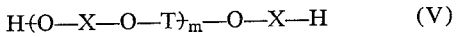

$$H(O-X-O-T)_m-O-X-H \quad (V)$$

In polymer (V) the terminal hydroxyl groups are primary alcohols as opposed to the more reactive phenolic hydroxyls in (III). Polymer (V) is obtained by vacuum pyrolysis of dihydroxyethylterephthalate, and the value of $m$, a number indicating the molecular weight of the polymeric intermediate, is controlled by the time and temperature of pyrolysis. The technique is well known in the art. The various polymers prepared in molecular weights resulting are reported in Table 2.

TABLE 2

| Intermediate (IV) | | I.V. of Final Product | |
|---|---|---|---|
| Mol Wt. | "$n$" | Polymer (I) | Polymer (II) |
| 2,350 | 6 | 0.71 | 0.46 |
| 4,500 | 12 | 0.74 | 0.55 |
| 8,800 | 24 | 0.93 | 0.42 |

It has been observed that random polymers of analogous composition to those of the present invention melt from about 100 to about 150° C. below the melting point of the polymers of the present invention. Furthermore, the solubilities of the two types of polymer have been observed to vary. For instance, polymer (I), having an inherent viscosity of 0.93 and prepared as taught in this example, has a polymer melt temperature of 259° C. and is observed to be insoluble in trichloroethylene, while the corresponding random copolymer has an inherent viscosity of 0.51, a polymer melt temperature of 152° C. and displays solubility in trichloroethylene.

EXAMPLE II

Polymer of Formula III wherein —X— is ethylene and $m$ being about 10 to provide a molecular weight of about 2200, is reacted, following the technique of Example I, with polymers of Formula IV wherein —Y— is 1,4-cyclohexylene and —Z— is 2,2-bis(p-phenylene)propane, $n$ being a number, in one preparation to provide a molecular weight of about 8900 and in a second preparation to provide a molecular weight of about 4500. Polymers corresponding to Formula I are thereby formed, the first having an inherent viscosity of 0.81 and a polymer melt temperature of 249° C. and the second having an inherent viscosity of 0.67 and a polymer melt temperature of 250° C. Fibers are spun from solutions of the polymer containing 23% by weight solids in a solvent of 75/25 (by volume) trichloroethylene/trifluoroacetic acid. Properties of fibers prepared under drawing conditions indicated are reported in Table 3.

TABLE 3

| Drawing | | Tensile Prop. | | Percent Boil Off Shrinkage |
|---|---|---|---|---|
| D.R. | Temp. (° C.) | BBO T/E/Mi | ABO T/E/Mi | |
| 2.0 | 68 | 1.31/13/22 | .54/11/14 | 30 |
| 2.6 | 150 | .77/5.9/23 | .54/4.9/16 | 23 |
| 2.0 | 147 | .71/13/20 | .53/4.5/15 | 19 |
| 2.5 | 147 | .71/6.8/20 | .61/4.1/22 | -------- |
| 3.0 | 160 | .69/7.6/20 | .61/12/16 | 71 |

For comparative purposes a random copolymer is made corresponding to the polymer reported above having an inherent viscosity of 0.81 and a polymer melt temperature of 249° C. The random copolymer has an inherent viscosity of 0.40 and a polymer melt temperature of 162° C. The block copolymer is insoluble in trichloroethylene whereas the random copolymer is soluble in the same solvent.

EXAMPLE III

Polymer of Formula III wherein —X— is ethylene, $m$ being about 10 to provide a molecular weight of about 2200, is reacted following the technique of Example I, with polymers of Formula IV wherein —Z— is p-dixlylenemethane and in one preparation —Y— is 1,4-cyclohexylene, $n$ being a number to provide a molecular weight of about 9500, and in a second preparation, —Y— is m-phenylene and $n$ is a number to provide a molecular weight of about 9450. Polymers corresponding to Formula I are thereby formed, the first having an inherent viscosity of 0.62 and a polymer melt temperature of 276° C., while the second has an inherent viscosity of 0.89 and a polymer melt temperature of about 272° C. Some decomposition is noted for each polymer at the polymer melt temperature.

EXAMPLE IV

Polymer of Formula III wherein —X— is ethylene, $m$ being about 10 to provide a molecular weight of about 2200, is reacted, following the technique of Example I with polymers of Formula IV wherein both —Y— and —Z— are m-phenylene and $n$ is a number to provide a molecular weight of 2800. A polymer corresponding to Formula I is to be found having an inherent viscosity of 0.53 and a polymer melt temperature of 251° C.

When a polymer is prepared by similarly reacting the same Formula IV polymer having a molecular weight of 2600 with a Formula V polymer, wherein —X— is ethylene, a Formula II block copolymer is formed having an inherent viscosity of 0.40 and a polymer melt temperature of 251° C.

As pointed out previously, the polymers of the present invention possess polymer melt temperatures and decreased sensitivity to solvents as compared to random copolymers of corresponding composition. Infrared spectra and differential thermal analysis indicate features of both polymer moieties in the segmented polymer. The X-ray patterns showed definite crystallinity indicating that the block copolymers of this invention introduce crystallinity into the amorphous polyphenyl ester. Furthermore, the high recovery associated with polyphenyl esters is largely retained in the block copolyesters.

In the specific examples above fibers are prepared from solutions of polymers. While this is the preferred method of forming shaped structures, the block copolymers of the present invention have sufficient stability in melt to permit the formation of coatings and shaped structures provided a copolymer is subjected to temperatures above its melting point for less than about 20 minutes. Preferably, this period is maintained to less than about 3 minutes. After prolonged heating to temperatures above its melting point, a block copolyester randomizes and the desirable properties are lost.

Many equivalent modifications of the above described invention will be apparent to those skilled in the art without a departure from the inventive concept.

What is claimed is:

1. A block copolyester having a structure from the class consisting of

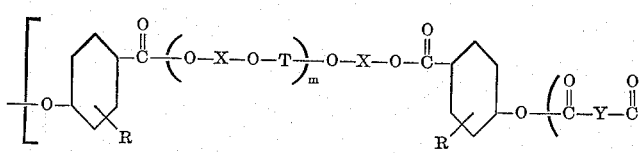

and

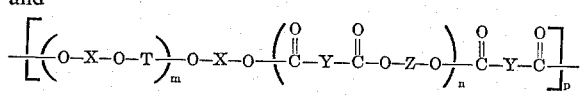

wherein X is lower alkylene, T is

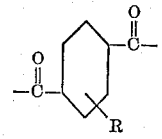

wherein the hexagon represents the benzene nucleus and R is a member of the class consisting of hydrogen of the said benzene nucleus and a substituent for no more than two hydrogen atoms of the said nucleus, said substituent being from the class consisting of lower alkyl, halogen, nitro, cyano and alkoxy, $m$ is a large number to provide a polyester group having a molecular weight of between about 900 and 3000, Y represents a member of the class consisting of

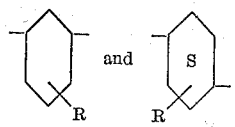

and Z represents a member of the class consisting of

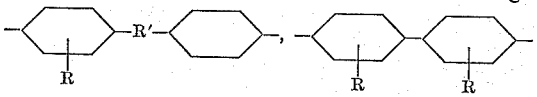

and

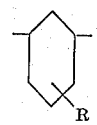

wherein R' is a member of the class consisting of lower alkylene,

and —O—, $n$ being a large number to provide a polyester group having a molecular weight of between about 4000 and 10,000, $p$ being a number from about 1 to about 10 inclusive.

2. Block copolyester (I) of claim 1 wherein —X— is ethylene, $m$ being about 10 to provide a molecular weight of about 2200, —Y— is m-phenylene, —Z— is 2,2-bis-(p-phenylene)propane and $n$ has a value of about 24.

3. Block copolyester (II) of claim 1 wherein —X— is ethylene, $m$ being about 10 to provide a molecular weight of about 2200, —Y— is m-phenylene, —Z— is 2,2-bis-(p-phenylene)propane and $n$ has a value of about 24.

4. Block copolyester (I) of claim 1 wherein —X— is ethylene, $m$ being about 10 to provide a molecular weight of about 2200, —Y— is 1,4-cyclohexylene, —Z— is 2,2-bis(p-phenylene)propane and $n$ is a number to provide a molecular weight of about 8900.

5. Block copolyester (I) of claim 1 wherein —X— is ethylene, $m$ being about 10 to provide a molecular weight of about 2200, —Y— is 1,4-cyclohexylene, —Z— is 2,2-bis(p-phenylene)propane and $n$ is a number to provide a molecular weight of about 4500.

6. Block copolyester (I) of claim 1 wherein —X— is ethylene, $m$ being about 10 to provide a molecular weight of about 2200, —Z— is p-dixlylenemethane, —Y— is 1,4-cyclohexylene and $n$ is a number to provide a molecular weight of about 9500.

7. Block copolyester (I) of claim 1 wherein —X— is ethylene, $m$ being about 10 to provide a molecular weight about 2200, —Z— is p-dixylylenemethane, —Y— is m-phenylene and $n$ is a number to provide a molecular weight of about 9450.

8. Block copolyester (I) of claim 1 wherein —X— is ethylene, $m$ being about 10 to provide a molecular weight of about 2200, —Y— and —Z— are each m-phenylene and $n$ is a number to provide a molecular weight of about 2800.

9. Block copolyester (II) of claim 1 wherein —X— is ethylene, $m$ being about 10 to provide a molecular weight of about 2200, —Y— and —Z— are each m-phenylene and $n$ is a number to provide a molecular weight of about 2600.

References Cited by the Examiner
UNITED STATES PATENTS 3,037,960  6/1962  Frazer _____ 260—860

FOREIGN PATENTS 132,546    5/1949  Australia.
613,918    8/1962  Belgium.
1,303,888  8/1962  France.

MURRAY TILLMAN, *Primary Examiner.*

SAMUEL H. BLECH, *Examiner.*

J. T. GOOLKASIAN, *Assistant Examiner.*